C. E. SARGENT.
MOTOR FOR RAILROAD VEHICLES.
APPLICATION FILED DEC. 13, 1916.
1,286,122.
Patented Nov. 26, 1918.
7 SHEETS—SHEET 1.
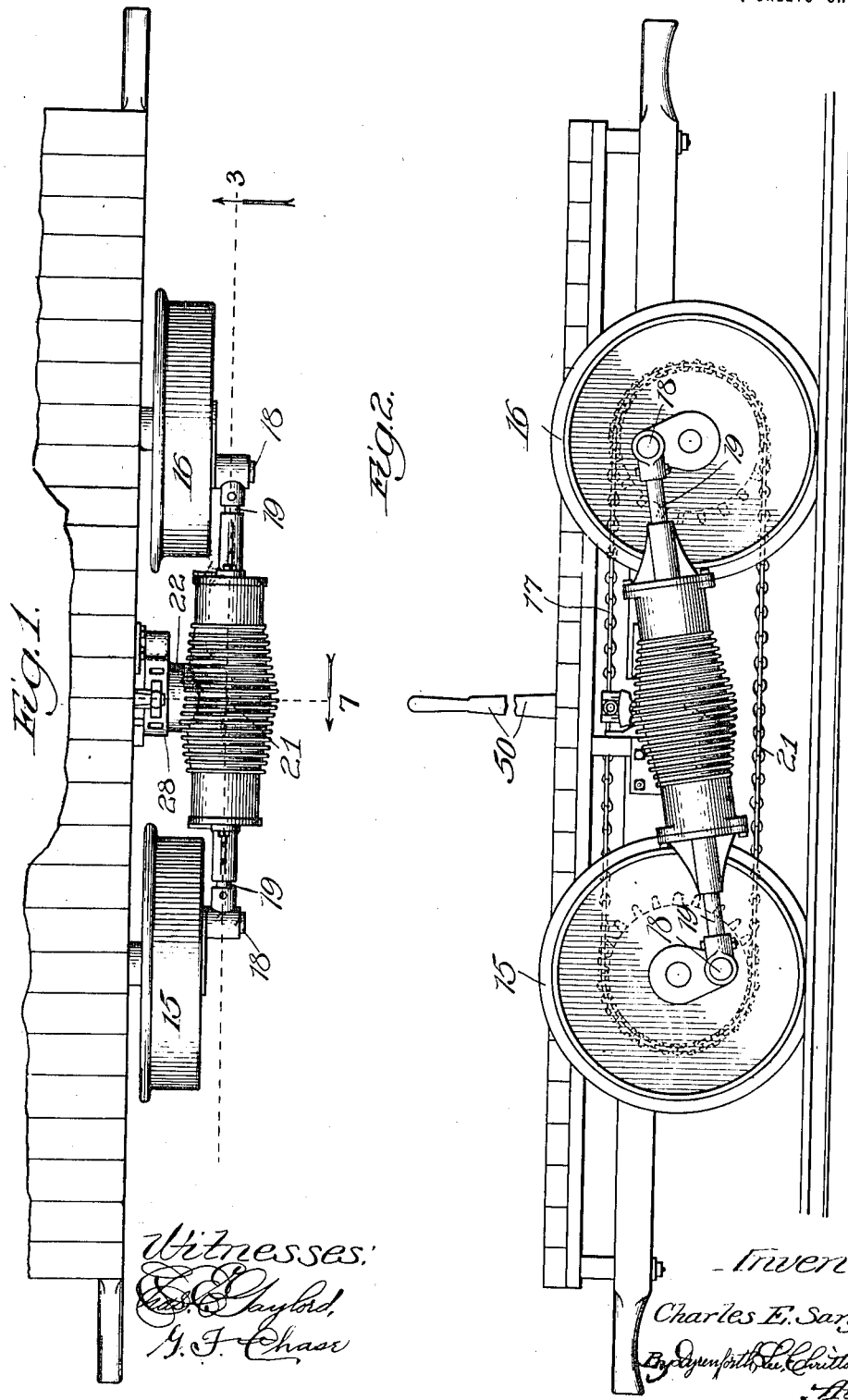

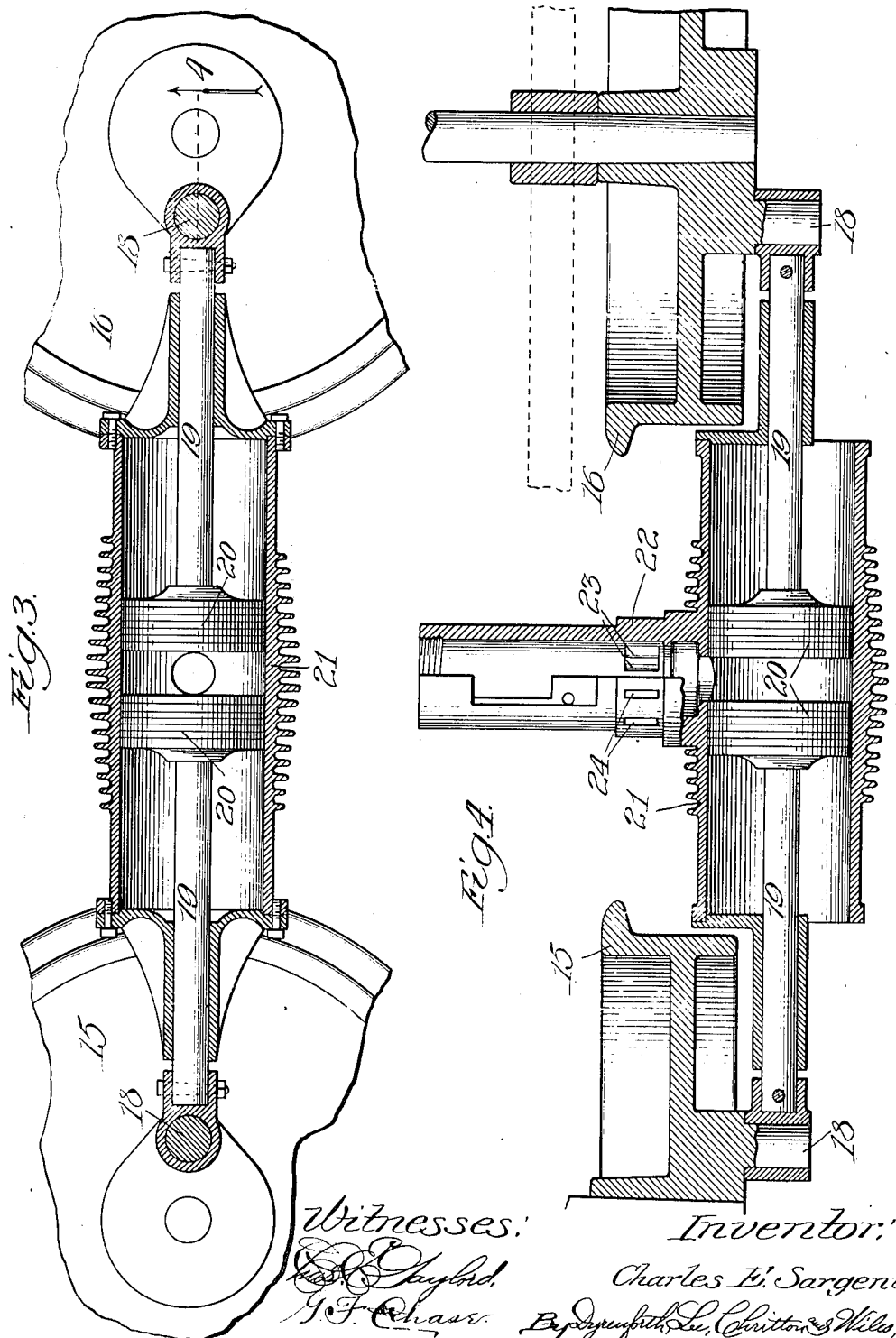

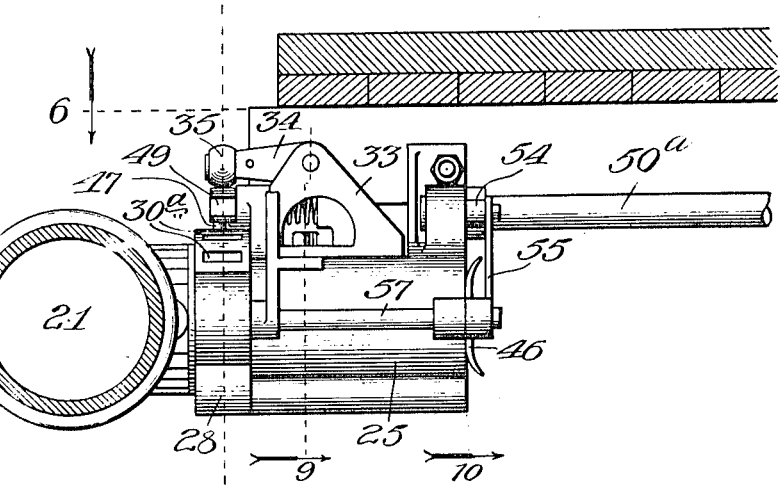
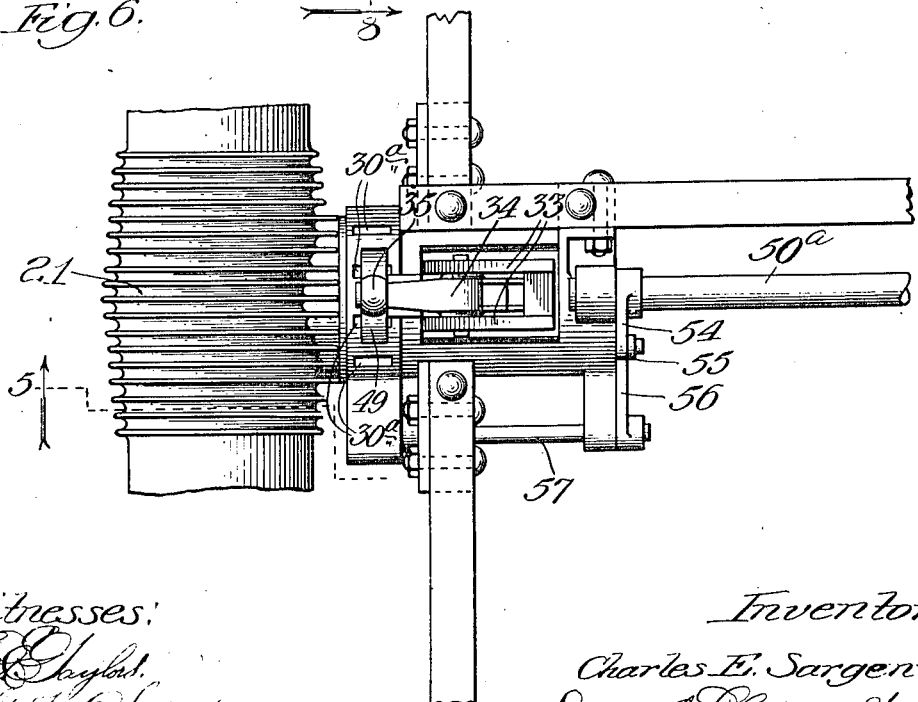

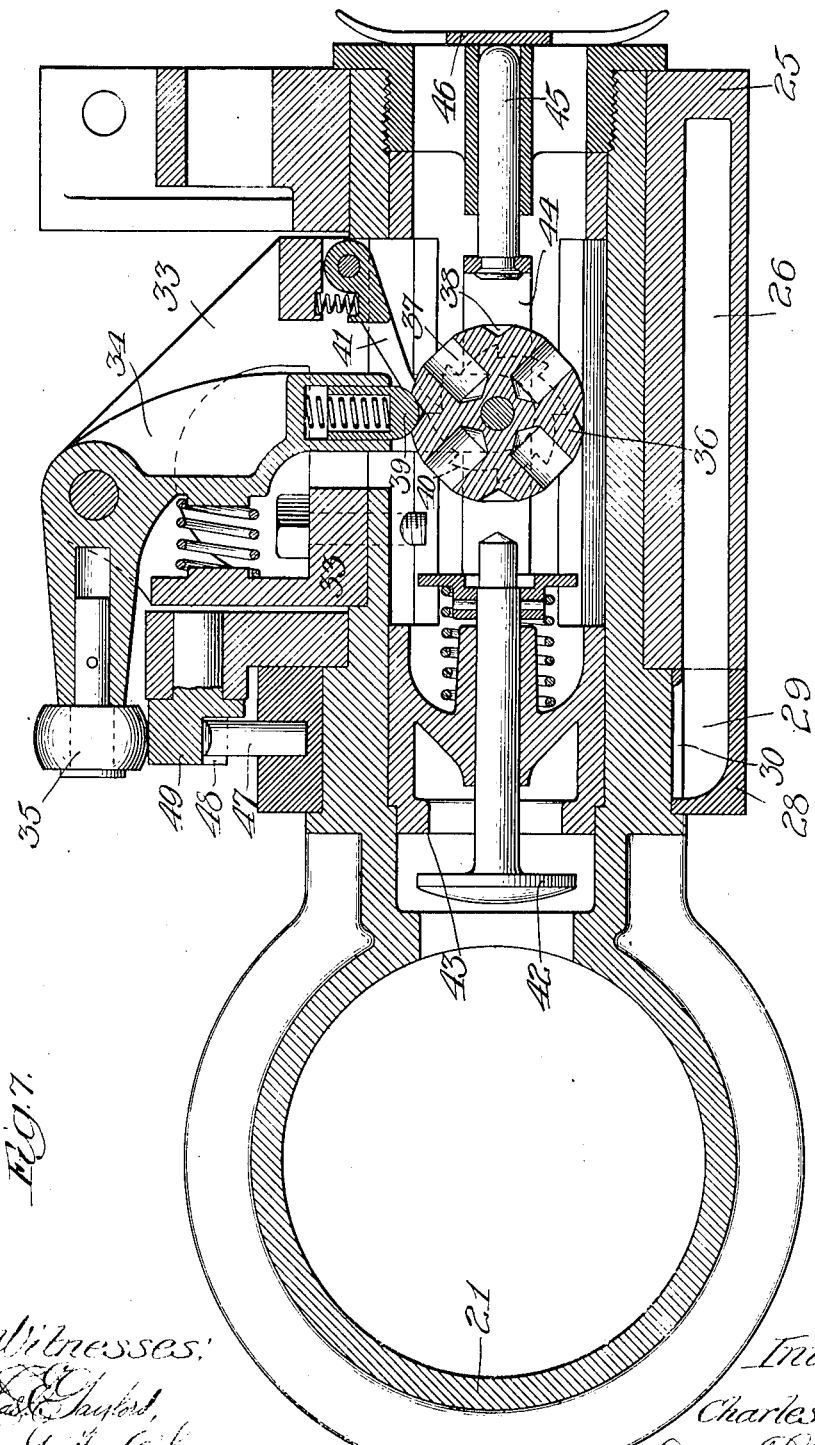

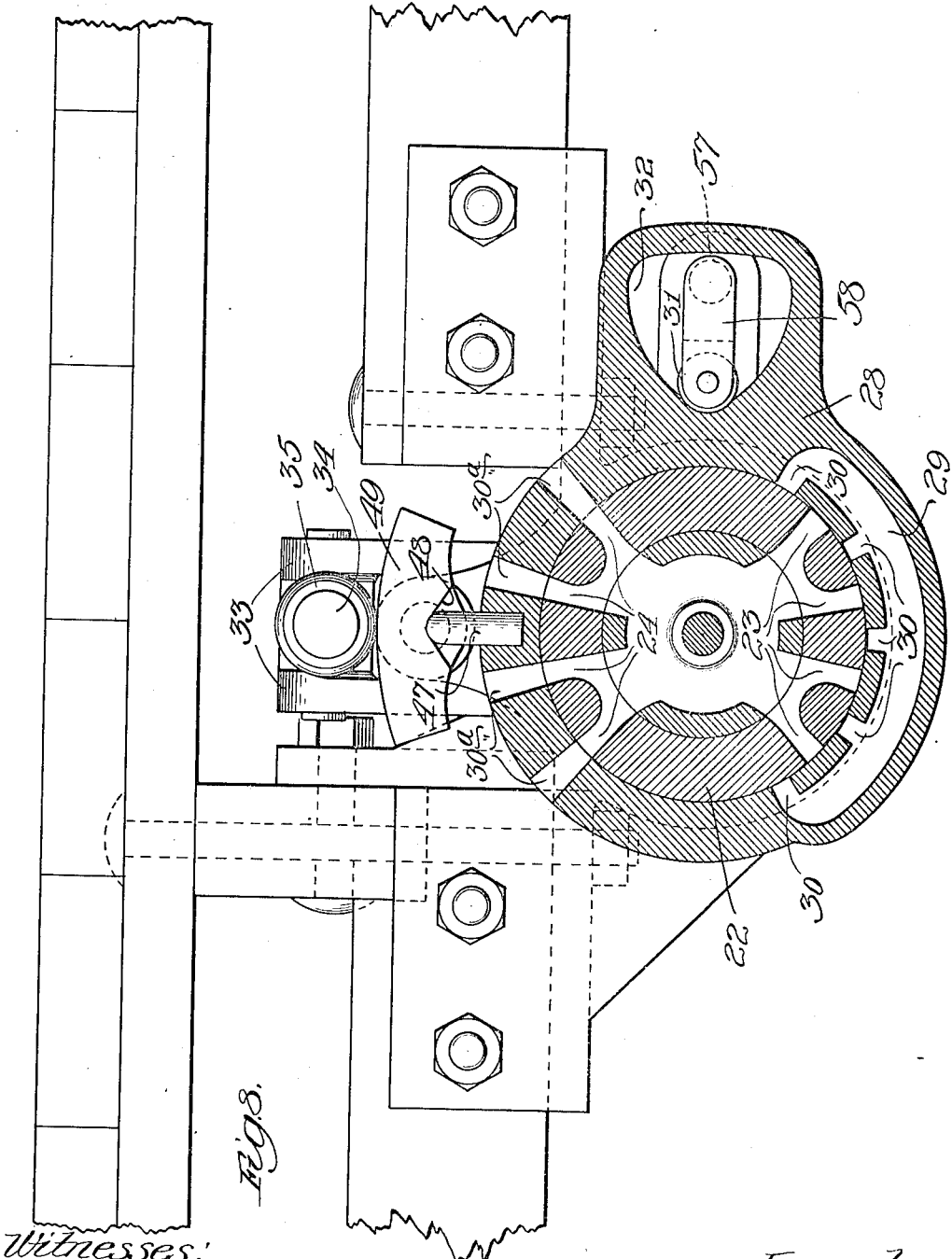

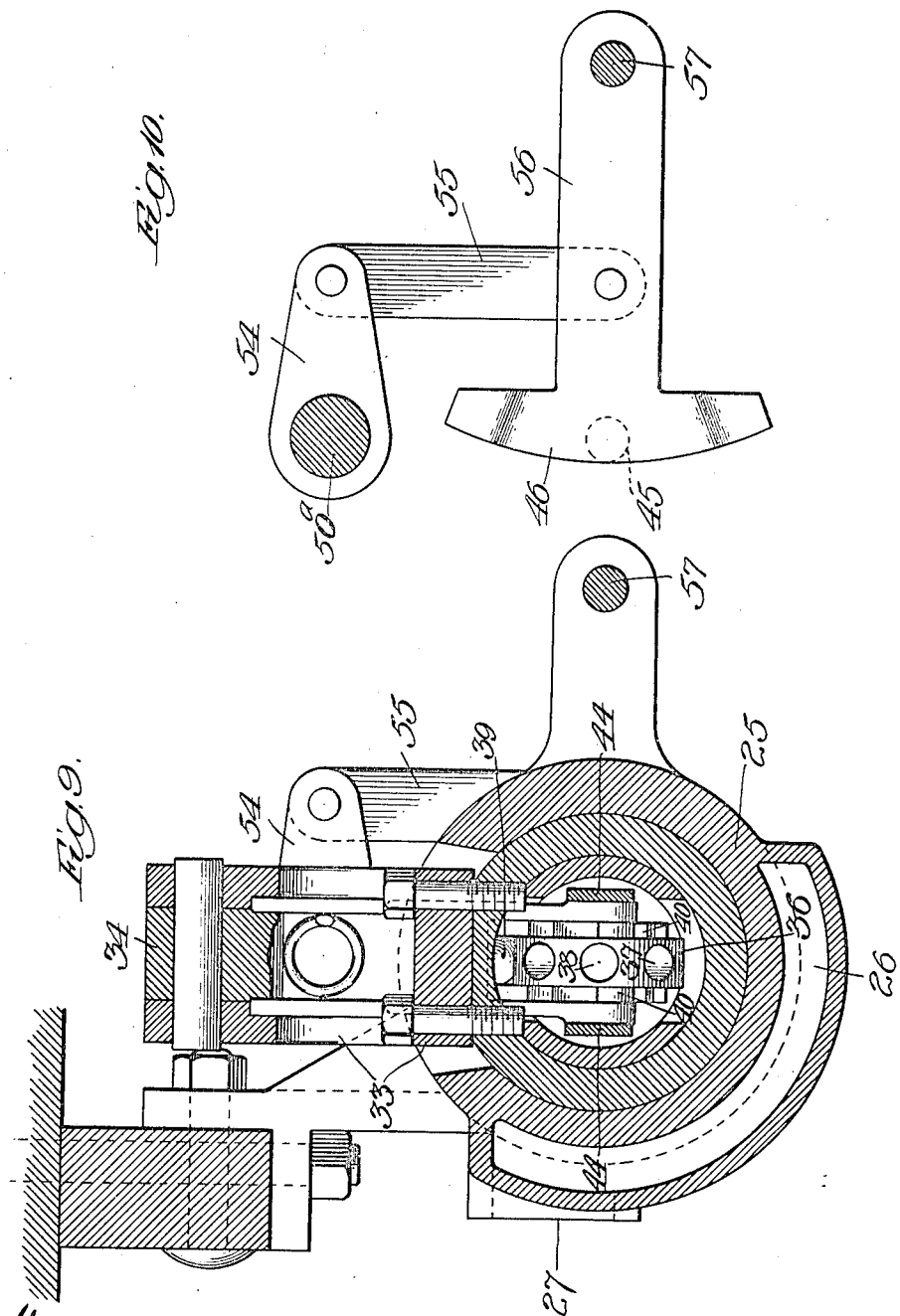

C. E. SARGENT.
MOTOR FOR RAILROAD VEHICLES.
APPLICATION FILED DEC. 13, 1916.

1,286,122.

Patented Nov. 26, 1918.
7 SHEETS—SHEET 7.

Witnesses:
E. E. Gaylord,
G. F. Chase.

Inventor:
Charles E. Sargent,
By Dyrenforth, Lee, Chritton & Wiles,
Attys.

UNITED STATES PATENT OFFICE.

CHARLES E. SARGENT, OF INDIANAPOLIS, INDIANA.

MOTOR FOR RAILROAD-VEHICLES.

1,286,122.   Specification of Letters Patent.   Patented Nov. 26, 1918.

Application filed December 13, 1916. Serial No. 136,818.

*To all whom it may concern:*

Be it known that I, CHARLES E. SARGENT, a citizen of the United States, residing at Indianapolis, in the county of Marion and State of Indiana, have invented a new and useful Improvement in Motors for Railroad-Vehicles, of which the following is a specification.

Figure 11:
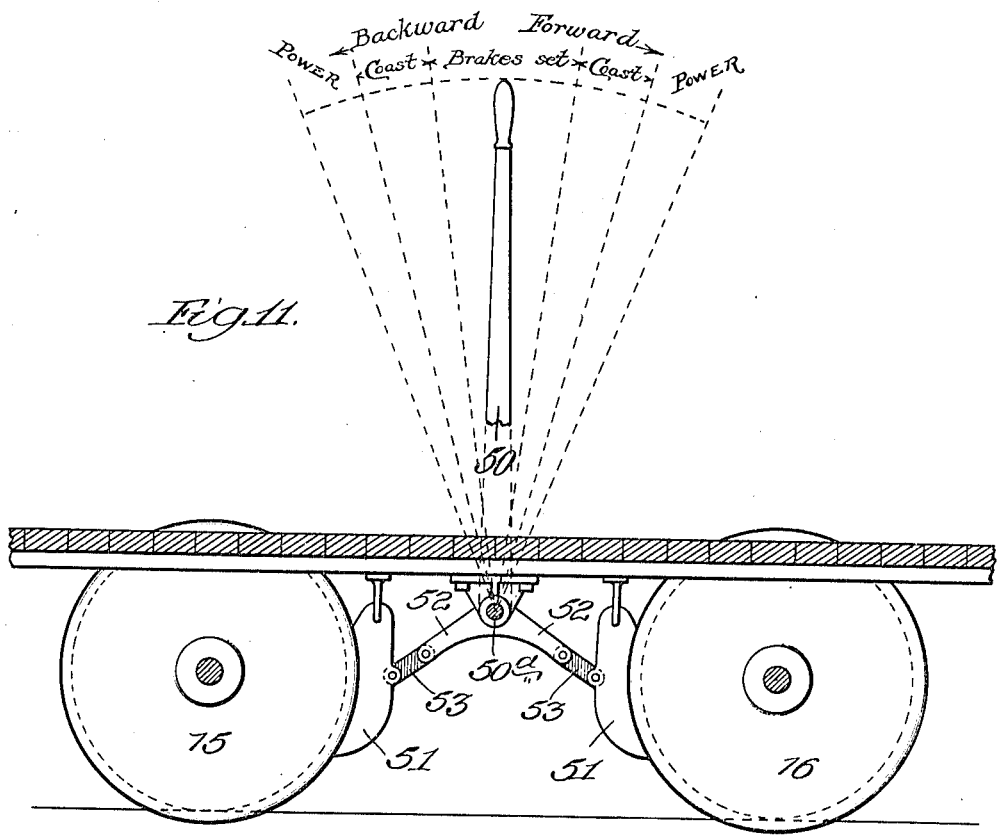
Figure 12:
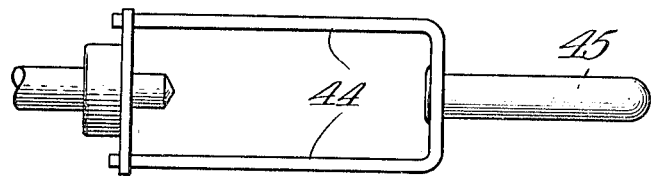
Figure 13:
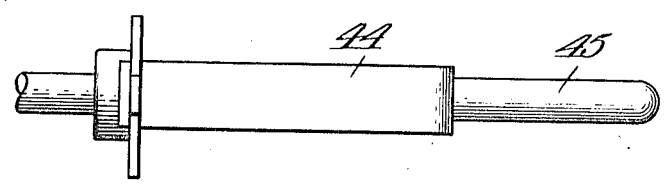

My invention relates to certain new and useful improvements in motors for railroad vehicles and is fully described and explained in the specification and shown in the accompanying drawings, in which:

Figure 1 is a top plan of the material portions of my improved device; Fig. 2 is a side elevation; Fig. 3 is a longitudinal section through the engine; Fig. 4 is a horizontal section on the line 4 of Fig. 3; Fig. 5 is a vertical section on the line 5 of Fig. 6; Fig. 6 is a horizontal section on the line 6 of Fig. 5; Fig. 7 is a vertical section on the line 7 of Fig. 1; Fig. 8 is a section on the line 8 of Fig. 5; Fig. 9 is a section on the line 9 of Fig. 5; Fig. 10 is a section on the line 10 of Fig. 5; Fig. 11 is a diagrammatic view showing the method of control, and Figs. 12 and 13 are views in two directions at right-angles to each other of the valve stem.

The present structure is so designed that it can be assembled using an ordinary railroad hand-car for the main part of the vehicle. Such a hand-car is shown in the drawings, its wheels being indicated by 15 and 16. The wheels are connected together by a sprocket chain 17 or by other equivalent means so as to cause them to rotate in unison. The wheels are provided with crank pins 18 displaced 180° with reference to each other so that as the wheels roll along the track, the crank pins alternately approach and recede from each other and, furthermore, the line between them constantly oscillates. Pivoted to these crank pins are piston rods 19 carrying pistons 20 running in a cylinder 21. The pistons, of course, approach and recede from each other as the wheels rotate, and the cylinder oscillates. The cylinder is provided with a laterally extending horizontal hollow trunnion 22 having intake ports 23 and exhaust ports 24 (Fig. 8). The trunnion is journaled in a bracket 25 having a gas conduit 26 (Fig. 7). The gas conduit opens at 27 (Fig. 9) and a carbureter of ordinary form may be attached for the purpose of generating the fuel mixture.

Mounted on the trunnion adjacent the cylinder is a reversing collar 28 (Figs. 7 and 8). This collar has in its lower part an intake conduit 29 having intake ports 30 adapted to register with the hollow trunnion ports 23 and also registering with the gas conduit 26 of the bracket 25. It also has in its upper part exhaust ports 30" opening to the atmosphere and adapted to register with the trunnion exhaust ports 24. The collar in Fig. 8 is shown with the machine in coasting position. When the engine is running the collar will be rocked in one direction or the other by the movement of a cam roller 31 in a cam opening 32. The manner in which this roller is moved will be hereinafter explained. At the present time it is only necessary to state that when the engine is running, the reversing collar is always rocked one way or the other from the position shown in Fig. 8, the direction of rocking depending upon the direction in which the engine is to turn. It will be seen from Fig. 8 particularly, that as the engine rocks with its trunnion, the interior of the trunnion will first be thrown into communication with the exhaust ports in the reversing collar and then into communication with the intake ports, this occurring at every oscillation of the cylinder. The hollow trunnion carries a bracket 33 affording pivotal support for a bell-crank lever 34 on the upper end of which is a roller 35 and the lower end of which is bifurcated and affords a journal for a star wheel 36 having a series of deep radial holes 37 and shallower radial holes 38 alternating with each other and spaced 45° apart. The star wheel is held in any given position by a spring-pressed centering stop 39 and it has on its sides ratchets 40 adapted to be engaged by pawls 41.

In the operation of the engine the bell-crank lever is swung on its pivot moving the star wheel back and forth. The star wheel performs this movement as will hereinafter be described for each oscillation of the engine. On each back stroke of the star wheel the pawl engages behind one of the teeth of the ratchet and forces the star wheel forward 45°, so that as the star wheel is rotated, it first presents one of its shallow holes and the next time one of its deep holes.

42 is a puppet valve seating on a seat 43 to cut off the interior of the cylinder from the hollow of the trunnion and from the ports. When the star wheel swings forward with a shallow hole in front, it opens this puppet valve, but when one of the deep holes is in front the puppet valve remains closed, because the stem of the puppet valve enters the deep hole and is unaffected by the movement of the star wheel. The puppet valve is thus opened at each alternate oscillation of the cylinder. This, it will be seen, affords the proper cycle of valve operation for a four-cycle engine when combined with the operation of the intake and exhaust ports hereinbefore described as occurring at each oscillation of the cylinder, the puppet valves supplementing this action so that during the alternate openings and closings of the intake and exhaust ports, they are cut off from the space within the cylinder.

The stem of the puppet valve is prolonged backward in the form of a yoke 44, which surrounds the star wheel and carries at the rear end a pin 45 which can be depressed by a cam-shaped valve opening plate 46, which operates to hold the puppet valve open when the engine is arranged for coasting.

The oscillation of the bell-crank lever takes place in the following manner: The reversing collar carries a pin 47 which engages with the cam surface 48 on the lower face of a valve-controlling cam 49 pivoted centrally. When the reversing collar is rocked in one direction that end of the valve-operating cam 49 toward which it moves is elevated and the other end is depressed, so that the upper surface of this cam takes an inclined position. Upon this surface the roller 35 on the upper end of the bell-crank lever 34 rocks. It is thus evident that as the cylinder oscillates in a given direction the bell-crank will be moved by engagement with the cam 49, the direction of its movement depending upon the setting of the reversing collar. It is thus evident that with the parts in the position shown in the drawings, the engine will coast, that if the reversing collar be set in one direction the parts will perform a proper cycle for rotating in one direction, while if the reversing collar be set in the opposite direction, the cycle will be proper for rotation in the opposite direction.

50 is a control lever on the car and 51 a pair of brake shoes pivoted to the car and adapted to operate on the wheels. The lever 50 is mounted on a shaft 50ᵃ carrying a pair of projecting arms 52 connected by links 53 with the brake shoes. When the lever is in central position as illustrated in Fig. 11, the toggles formed by these arms and links are so situated that the brake is set. When the lever is moved in either direction from the center the brakes are taken off and the car is free to coast, but nothing is done to the engine. The engine begins to operate only when the lever reaches nearly the extreme of its movement in either direction and the connections by which it operates will now be explained. Obviously, the first thing which must be done in permitting the engine to operate is to remove the valve-opening plate 46. This is done by the mechanism shown in Figs. 5, 6 and 10. The shaft 50ᵃ carries the radial arm 54 connected by a link 55 with a projection 56 made integral with the plate 46 and by which it receives pivotal support. As the shaft rocks in either direction from the central position, the plate 46 is gradually moved away until it finally slides off the valve stem and permits the valve to close in the normal manner. The engine then ceases to be in coasting position. The projection 56 carried by the plate 46 is fast on a shaft 57 which is rotated as the plate 46 moves up and down. This shaft carries on its forward end an arm 58 (Fig. 8), which is the arm carrying the roller 31 heretofore described. Consequently, the rocking of the shaft 57 causes the reversing collar to take either of the desired running positions.

The foregoing completes the description of the material portions of the present mechanism. It is believed that the operation will be thoroughly understood from the description of the various parts heretofore given, the operation of which has been set out as they have been described. I have shown neither an ignition system, a carbureter or any throttling control for the present device because these are well known in the art and can be supplied in varying form by any one skilled in the art. The intake opening has been described and illustrated and it will be understood that if any ordinary carbureter is applied thereto, it will normally be provided with some sort of a throttling mechanism which may be connected up in any desired manner, depending upon the design of the carbureter employed. Any suitable ignition may be employed, a satisfactory form being a magneto driven in any suitable manner.

The present structure is peculiarly desirable, not only because of its simplicity and sturdiness, but because it is of a form which can be attached, without difficulty, to any ordinary hand-car. The whole power plant and control mechanism of the present structure can be fitted, without any difficulty, to the frame of the ordinary hand-car and will operate successfully thereon.

I realize that considerable variation is possible in the details of this construction without departing from the spirit of my invention; therefore I do not intend to limit myself to the specific form herein shown and described except as pointed out in the following claims, in which it is my intention to claim all the novelty inherent in the construction as broadly as is permitted by the state of the art.

What I claim as new and desire to secure by Letters Patent, is:—

1. In combination, two shafts, each having a crank pin, the two crank pins being located oppositely on the two shafts, a single oscillating cylinder provided with a hollow ported trunnion on which it oscillates, two pistons therein connected to the two cranks, respectively, a ported bearing in which the trunnion oscillates to bring its ports alternately into registration with the ports in the bearing, and a valve operated on alternate oscillations of the cylinder for alternately connecting and cutting off the hollow of the trunnion from the cylinder.

2. In combination, two shafts, each having a crank pin, the two crank pins being located oppositely on the two shafts, a single oscillating cylinder provided with a hollow ported trunnion on which it oscillates, two pistons therein connected to the two cranks, respectively, a ported bearing in which the trunnion oscillates to bring its ports alternately into registration with the ports in the bearing, a valve operated on alternate oscillations of the cylinder for alternately connecting and cutting off the hollow of the trunnion from the cylinder, and means to shift the ported bearing and vary the operation of the valve to permit the engine to run in either direction.

3. In combination, two cranks, each having a crank pin, the two crank pins being located oppositely on the two cranks, a single oscillating cylinder provided with a hollow ported trunnion on which it oscillates, two pistons therein connected to the two cranks, respectively, a ported bearing in which the trunnion oscillates to bring its ports alternately into registration with the ports of the bearing, a puppet valve between the hollow trunnion and the cylinder, a lever carried by the cylinder and operating on each alternate oscillation of the cylinder to open the puppet valve.

4. In combination, two cranks, each having a crank pin, the two crank pins being located oppositely on the two cranks, a single oscillating cylinder provided with a hollow ported trunnion on which it oscillates, two pistons therein connected to the two cranks, respectively, a ported bearing in which the trunnion oscillates to bring its ports alternately into registration with the ports of the bearing, a puppet valve between the hollow trunnion and the cylinder, a lever carried by the cylinder, a cam on which the lever runs to operate the lever as the cylinder oscillates, means to shift the cam to provide for reversing the engine, and connections between the lever and puppet valve rendering alternate movements of the lever idle and the others active to operate the puppet valve.

5. In combination, two cranks, each having a crank pin, the two crank pins being located oppositely on the two cranks, a single oscillating cylinder provided with a hollow ported trunnion on which it oscillates, two pistons therein connected to the two cranks, respectively, a ported bearing in which the trunnion oscillates to bring its ports alternately into registration with the ports of the bearing, a puppet valve between the hollow trunnion and the cylinder, a lever carried by the cylinder, a rotary valve-contacting member carried by the lever and rotating step by step as the lever oscillates, and arranged with solid and open parts to aline alternately with the valve stem to operate the valve only on alternate cylinder oscillations.

6. In combination, two cranks, each having a crank pin, the two crank pins being located oppositely on the two cranks, a single oscillating cylinder provided with a hollow ported trunnion on which it oscillates, two pistons therein connected to the two cranks, respectively, a ported bearing in which the trunnion oscillates to bring its ports alternately into registration with the ports of the bearing, a puppet valve between the hollow trunnion and the cylinder, a lever carried by the cylinder, a rotary valve-contacting member carried by the lever, a ratchet on the valve-contacting member, a pawl to rotate the valve-contacting member on the back stroke of the lever, said member having solid and open parts to aline alternately with the valve stem to operate the valve only on alternate cylinder oscillations.

7. In combination, two shafts, each having a crank pin, the two crank pins being located oppositely on the two shafts, a single oscillating cylinder provided with a hollow ported trunnion on which it oscillates, two pistons therein connected to the two cranks, respectively, a ported bearing in which the trunnion oscillates to bring its ports alternately into registration with the ports in the bearing, a valve operated on alternate oscillations of the cylinder for alternately connecting and cutting off the hollow of the trunnion from the cylinder, a control lever, means operated by the control lever when in neutral position to hold the valve open, connections between said lever and the ported bearing to shift the same and the timing of the valve oppositely as the lever moves in opposite directions to set the engine to run in two directions.

8. In combination, two shafts, each having a crank pin, the two crank pins being located oppositely on the two shafts, a single oscillating cylinder provided with a hollow ported trunnion on which it oscillates, two pistons therein connected to the two cranks, respectively, a ported bearing in which the trunnion oscillates to bring its ports alternately into registration with the ports in the bearing, a valve operated on alternate oscillations of the cylinder for alternately connecting and cutting off the hollow of the trunnion of the cylinder, a control lever, means operated by the control lever when in neutral position to hold the valve open, connections between said lever and the ported bearing to shift the same and the timing of the valve oppositely as the lever moves in opposite directions to set the engine to run in two directions, and a brake for the shaft controlled by the lever when in central position.

In witness whereof, I have hereunto set my hand and affixed my seal this 6th day of December, 1916.

CHARLES E. SARGENT.